(12) United States Patent
Hong et al.

(10) Patent No.: US 6,812,681 B1
(45) Date of Patent: Nov. 2, 2004

(54) DIGITAL DYNAMIC TRACE ADJUSTMENT PULSE WIDTH MODULATE CONTROLLER

(75) Inventors: Chin-Tsai Hong, Taipei (TW); Chung-Fu Chou, Taipei (TW); Chun-Ting Lu, Hsin-Chuang (TW); Thou-Vun Pang, Chung-Ho (TW)

(73) Assignee: Silicom Technology Co., Ltd., Taipei (TW)

(*) Notice: Subject to any disclaimer, the term of this patent is extended or adjusted under 35 U.S.C. 154(b) by 37 days.

(21) Appl. No.: 10/417,539

(22) Filed: Apr. 16, 2003

(51) Int. Cl.[7] .................................................. G05F 1/40
(52) U.S. Cl. ........................ 323/283; 323/322; 375/238
(58) Field of Search ................................ 323/282, 283, 323/284, 285, 288, 322, 326; 363/65; 375/238; 330/10

(56) References Cited

U.S. PATENT DOCUMENTS

| | | | |
|---|---|---|---|
| 5,629,610 A | * | 5/1997 | Pedrazzini et al. ......... 323/283 |
| 6,169,669 B1 | * | 1/2001 | Choudhury ................... 363/37 |
| 6,373,334 B1 | * | 4/2002 | Melanson ..................... 330/10 |

* cited by examiner

*Primary Examiner*—Jessica Han

(57) ABSTRACT

A digital dynamic trace adjustment pulse width modulate controller uses a core processing unit to receive a phase signal and outputs a pulse width modulate signal. It is observed that when the output voltage is rising or dropping then changing the pulse width modulate signal of the output end, the duty rate of the phase signal will be maintained at fifty percent degree.

5 Claims, 4 Drawing Sheets

DIGITAL DYNAMIC TRACE ADJUSTMENT PULSE WIDTH MODULATE CONTROLLER

FIELD OF THE INVENTION

This invention relates to a digital dynamic trace adjustment pulse width modulate controller comprising: a comparator unit and a converter unit, wherein the comparator unit outputs/inputs a voltage (Vo) and a reference voltage (Vref), and also outputs a phase signal having low-level and high-level standards and further a core digital processing unit being also included, wherein the core digital processing unit outputs a pulse width modulate signal.

Through the function of the previously mentioned units, the feature of the invention is mainly to use a digital dynamic trace adjustment pulse width modulate controller to suit for voltage variation, and to use the core processing unit to receive pulse width modulate phase signal. It is observed that when the output voltage is gradually dropping or rising, changing the pulse width modulate phase signal on the output end, the duty rate of the phase signal will be maintained at a fifty percent degree.

Through the function of the previously mentioned units, the root mean square of the output voltage of the converter unit is equal to the root mean square of the reference voltage.

BACKGROUND OF THE INVENTION

U.S. Pat. No. 5,629,610 discloses a wholly digital electric current model pulse width modulate controller comprising two comparators combined together. Each of the comparators reads in the voltage drop of a sensor resistance. The first comparator utilizes an open loop electric current model control and the second comparator builds a higher second electric current threshold, wherein the electric current threshold is higher than the first electric current threshold. When the electric current is output, the current level standard runs free across the second current threshold and the second comparator triggers a disabling circuit of an output power transistor and sustains for a fixed period of time.

The situation may occur, because,e in off-phase state, the output power transistor, the additional stored electric energy is insufficiently discharging electricity from load circuitry inductance. And the frequency can be kept out of the intentional frequency range to avoid interference.

U.S. Pat. No. 6,373,334 B1 pertains to a device for reducing the distortion and noise of a high power digital pulse width modulate amplifier. Through measuring of the difference between the estimated output signal and the real output signal, an analog error is generated due to analog to digital convert (adc) process error. The digital error signal is then added to real time delta sigma modulator correction process. Preferably, not only the modulate signal can he adjusted by a feedback process, but also the well known electric circuitry predicted error can be adjusted through time signal delta sigma modulator.

A certain analog-digital converter allows this loop delay to be reduced to minimum and not to sacrifice its precision.

SUMMARY OF THE INVENTION

A first object of the present invention is to use a core processing unit to receive the output pulse width modulate phase signal. Upon sensing rising or dropping of an output voltage, changing the pulse width modulate signal of the output end such that the time elapses of high level standard and low level standard arc equal. That is, the duty rate of signal phase is maintained at fifty percent degree.

A second object of the present invention is to use a core processing unit to receive the pulse width modulate phase signal. Upon sensing rising or dropping of an output voltage, changing the pulse width modulate signal of the output end such that the root mean square of the phase signal output voltage of the converter unit is equal to the root mean square of the reference voltage.

A third object of the present is to proceed a digital dynamic trace adjustment such that the process of analog to digital converter is avoided, wherein the adjustment uses a comparator unit to output a voltage standard that lies within (but not included) the maximum voltage level standard and the minimum voltage level standard of a reference voltage (Vref) and proceed the digital dynamic trace pulse width modulate adjustment process.

The present invention will become more obvious from the following description when taken in connection with the accompanying drawings that show, for purpose of illustration only, preferred embodiments in accordance with the present invention.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
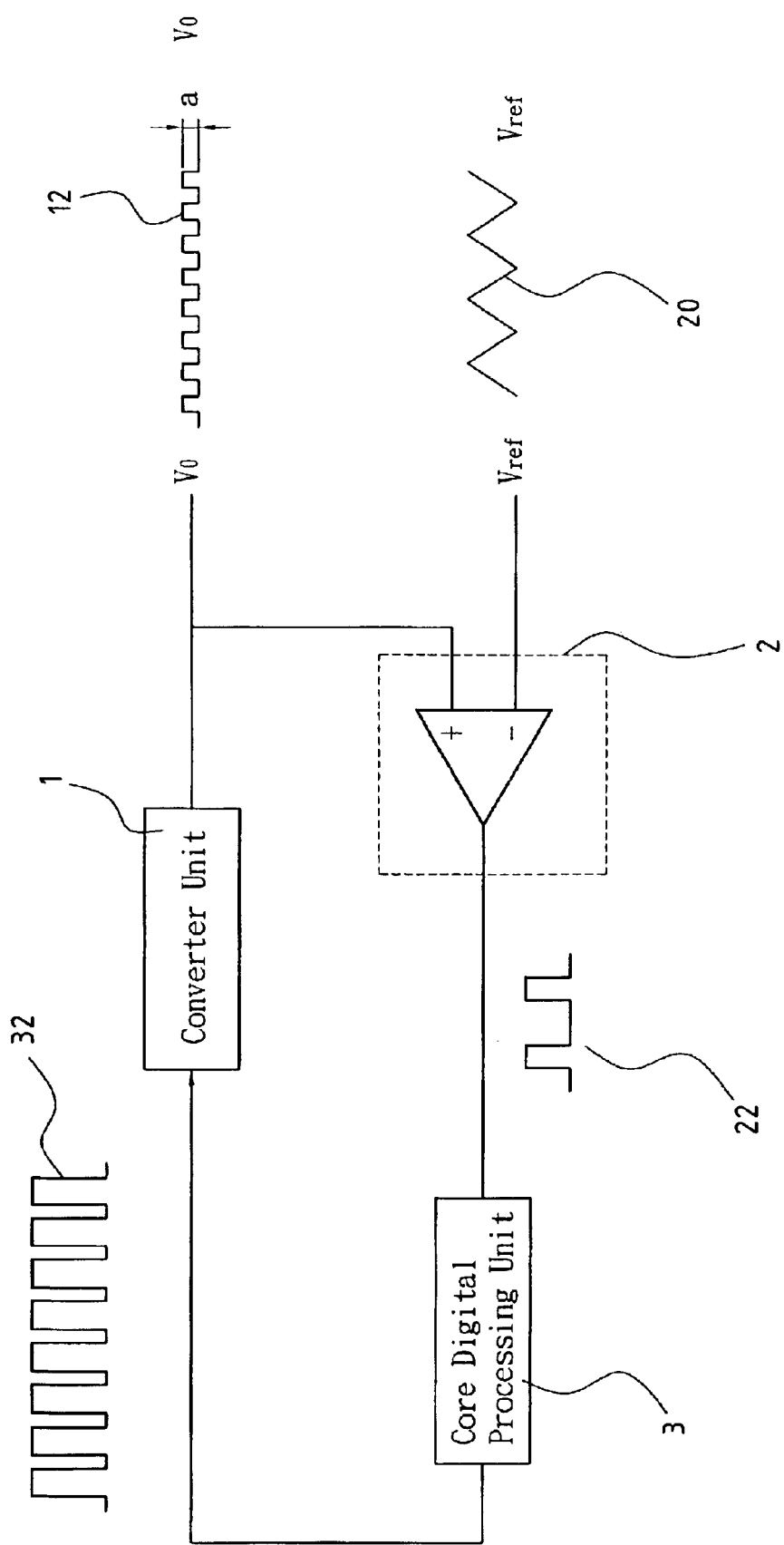
FIG. 1 depicts a block diagram showing the function of each unit in a first embodiment of the present invention.

FIG. 1 is a block diagram showing the function of each unit in a first embodiment of the present invention. The present invention is equipped with a digital dynamic trace adjustment pulse width modulate controller, wherein the controller uses the following characteristic such that the time elapses in high level standard is equal to the time elapse in low level standard (namely the duty rate of the signal phase 22 can be maintained at fifty percent degree) and such that the root mean square of the phase signal output voltage (Vo) 12 of a converter unit 1 is equal to the root mean square of the reference voltage (Vref) 20.

The digital dynamic trace adjustment pulse width modulate controller of the present invention comprises: a converter unit 1, wherein the converter unit 1 comprises at least one input end and at least one output end. The input end is an input channel for a pulse width modulate signal 32. Through the control of the input pulse width modulates signal 32, the output end generates an output voltage (Vo) 12 for at least one load to use. The output voltage (Vo) 12 level standard of converter unit 1 lies between (but not including) the maximum and the minimum level standard of a reference voltage (Vref) 20 level standard. The controller further comprises a comparator unit 2, wherein the comparator unit 2 has a positive input end, a negative input end and an output end, wherein the positive input end and the negative input end receive respectively the output voltage (Vo) 12 and the reference voltage (Vref) 20 of converter unit 1, while the output end provides a phase signal 22 as an output, wherein the phase signal has two kinds of level standard which includes high level standard and low level standard.

The time elapse of the phase signal 22 at high level standard is increasing while the output voltage (Vo) 12 is decreasing, and/or the time elapse of the phase signal 22 at low level standard is decreasing while the output voltage (Vo) 12 is increasing. Also the time elapse of the phase signal 22 at high level standard is shortened while the output voltage (Vo) 12 is increasing, and/or the time elapse of the phase signal 22 at low level standard is extending while the output voltage (Vo) 12 is increasing.

The controller further comprises core digital processing unit 3. The core processing unit 3 comprises at least one input end and an output end, wherein the input end receives phase signal 22 as an input, and output a pulse width modulate signal 32 to an output end. The pulse width modulate signal 32 has a high-side level standard and a low-side level standard. The high-side level standard pulse width modulate signal 32 is able to generate an output voltage (Vo) 12 of the converter unit 1 to drive load, while the low-side level standard pulse width modulate signal 32 is able to generate an output voltage (Vo) 12 of the converter unit 1 but can not drive load.

The core processing unit 3 receives the phase signal 22 from input end and outputs a pulse width modulate signal 32 to the output end. It is observed that the time elapsed at high level standard is extended when the output voltage (Vo) 12 is dropping, and/or the time elapse of the phase signal 22 at low level standard is shortened when the output voltage 12 is dropping. In this way, the pulse width modulate signal 32 is changed and the output voltage (Vo) 12 of the converter unit 1 is raised. Eventually, the time elapse of high level standard of phase signal 22 is equal to the time elapse of low level standard of phase signal 22. That is, the duty rate of phase signal 22 will be maintained at fifty percent degree.

Figure 2:
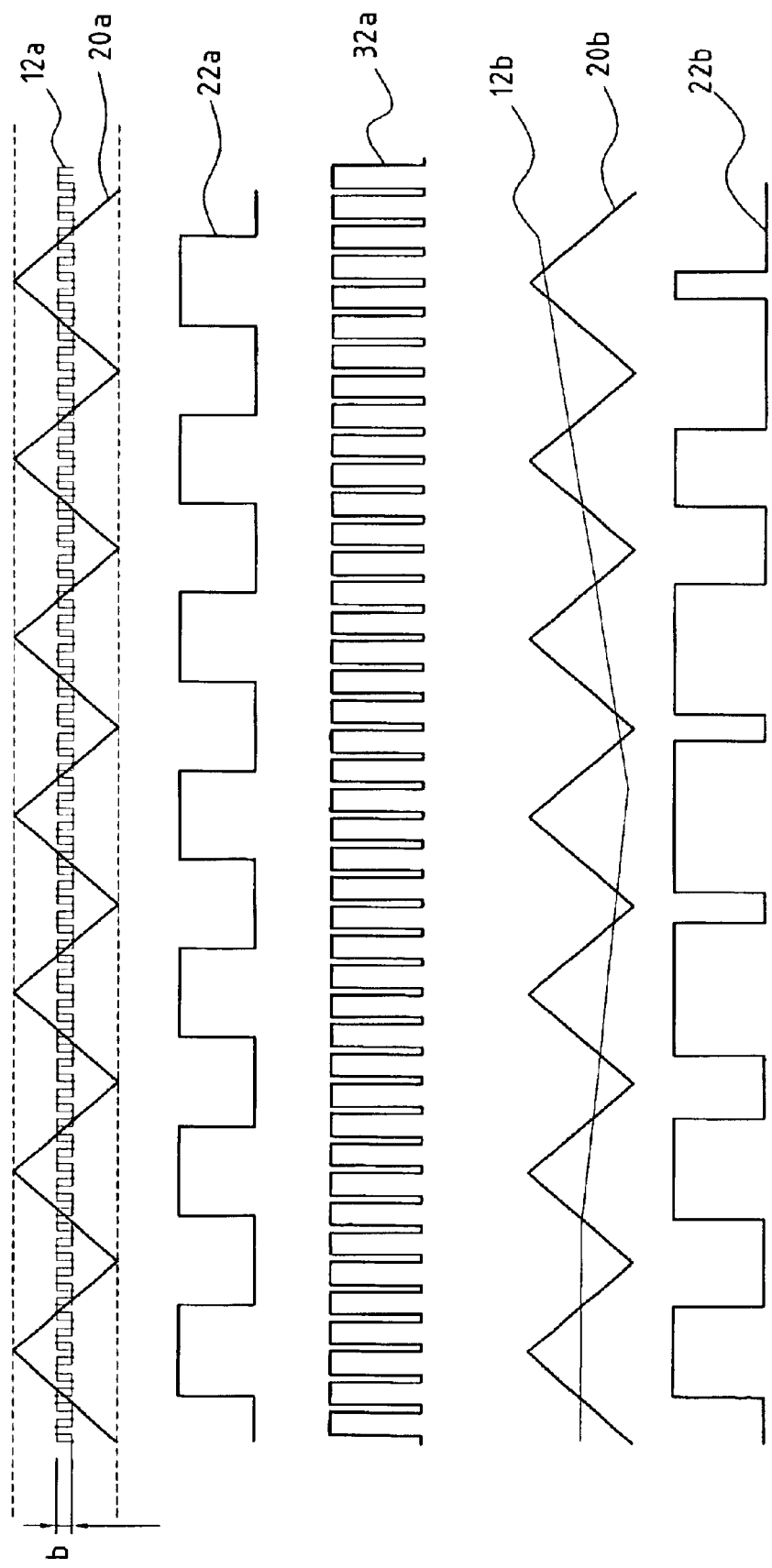
FIG. 2 depicts a block diagram showing the associated signal time series of each unit in the first embodiment.

FIG. 2 shows the signal time series of each unit in the first embodiment of the present invention, comprising a digital dynamic trace adjustment pulse width modulate controller. Theoretically, the output end of converter unit 1 produces an output voltage (Vo) 12a. Under the case for an ideal design of this device, the output voltage (Vo) 12a should be kept in a steady voltage value so that it provides for at least one load to use. The output voltage (Vo) 12a has a ripple characteristic such that the difference between the peak and the trough is only about several micro volt (mV), and can be denoted as b.

Still in this diagram, in comparator 2, a referenced voltage (Vref) 20a is input to a negative input end, and an output voltage (Vo) 12a generated from the converter unit 1 is input to a positive input end and a phase signal 22a is generated to the output end of comparator unit 2, wherein the phase signal has two kinds of level standards, which includes high and low level standards. It is to be noticed that the voltage level standard of the output voltage (Vo) 12a of the converter unit 1 lies between (but not including) the maximum voltage standard and the minimum voltage standard of the referenced voltage 20a.

Theoretically, the input end of core digital processing unit 3 receives the phase signal 22a as an input, and it also outputs a pulse width modulate signal 32a to the output end. The pulse width modulate signal 32a has two kinds of level standards, which include high-side level standard and low-side level standard. On high-side level standard pulse width modulate signal 32a, it is able for the converter unit 1 to output a voltage 12a to drive load and, on the other hand, on low-side level standard pulse width modulate signal 32a, it is able for the converter unit 1 to output a voltage 12a but not able to drive load.

Essentially, the load may be changed during the operation process. The change of load results in a variation in output voltage (Vo) 12b, after a short period of time later. In the comparator unit 1, the reference voltage (Vref) 20b is input to the negative input end. While the output voltage (Vo) 12b generated from the output end of the converter unit 1 is input to a positive input end thus producing a phase signal 22b in the output end of the comparator unit 2, the time elapsed in either the high level or the low level will not be equal in a time period.

The present invention comprising digital dynamic trace adjustment pulse width modulate controller is designed and suited for the variation of output voltage (Vo) 12b, using the core processing unit 3 to receive the phase signal 22b as an input, and output a pulse width modulate signal 32b to the output end. It is observed that the time elapsed when phase signal is on high level is increasing when the output voltage 12b is dropping, and/or the time elapsed when phase signal is on low level is shortening when the output voltage (Vo) 12b is dropping. In this way, the output voltage (Vo) of the converter unit 1 is rising, and eventually, the time elapsed of the high level of phase signal 22b is equal to the time elapsed of the low level of phase signal 22b. That is, the duty rate of the phase signal 22b is kept on fifty percent degree.

Figure 3:
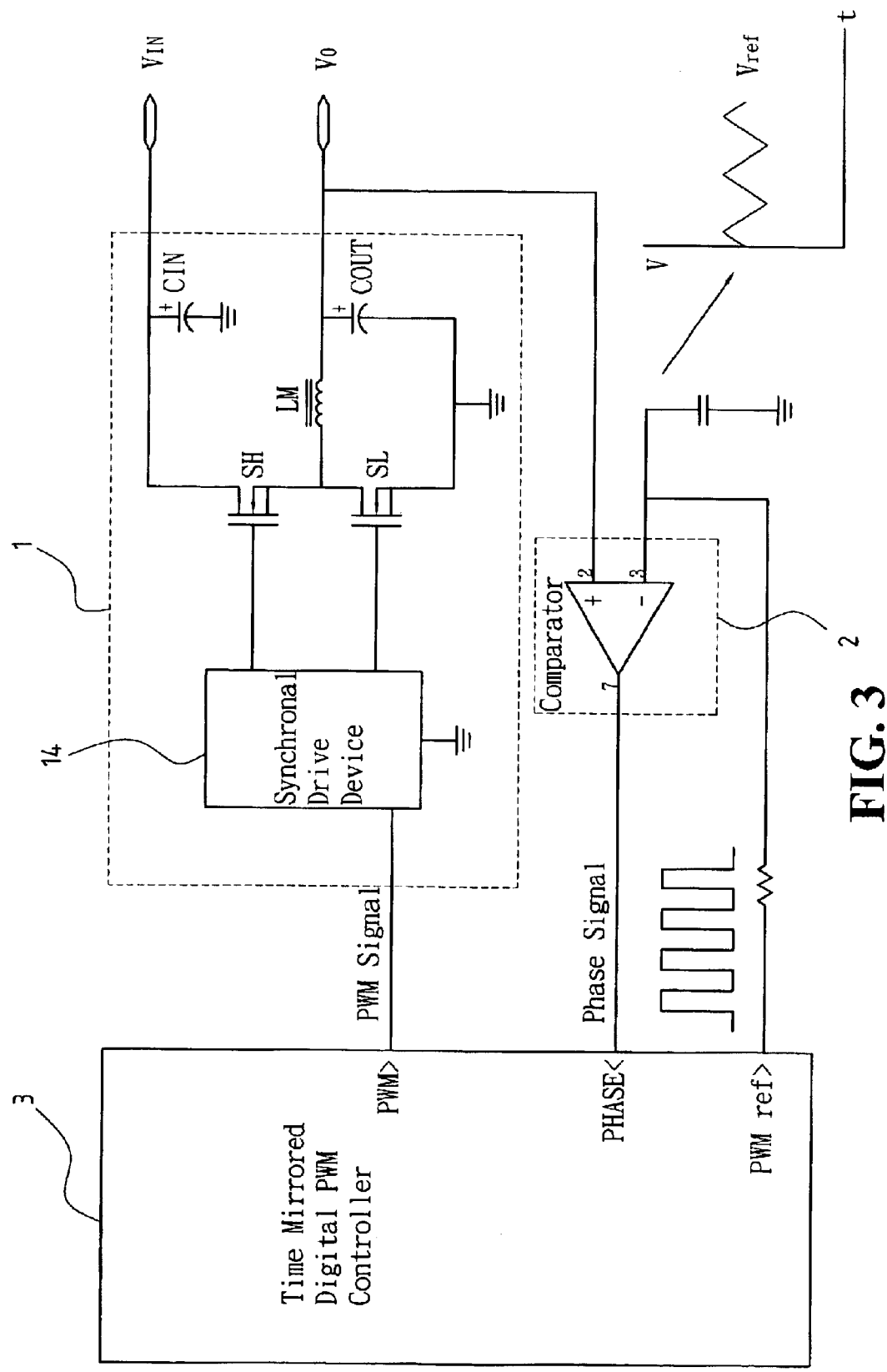
FIG. 3 depicts a diagram showing the detailed circuit connection of the digital trace pulse width modulate controller in the first embodiment of the present invention.
Figure 4:
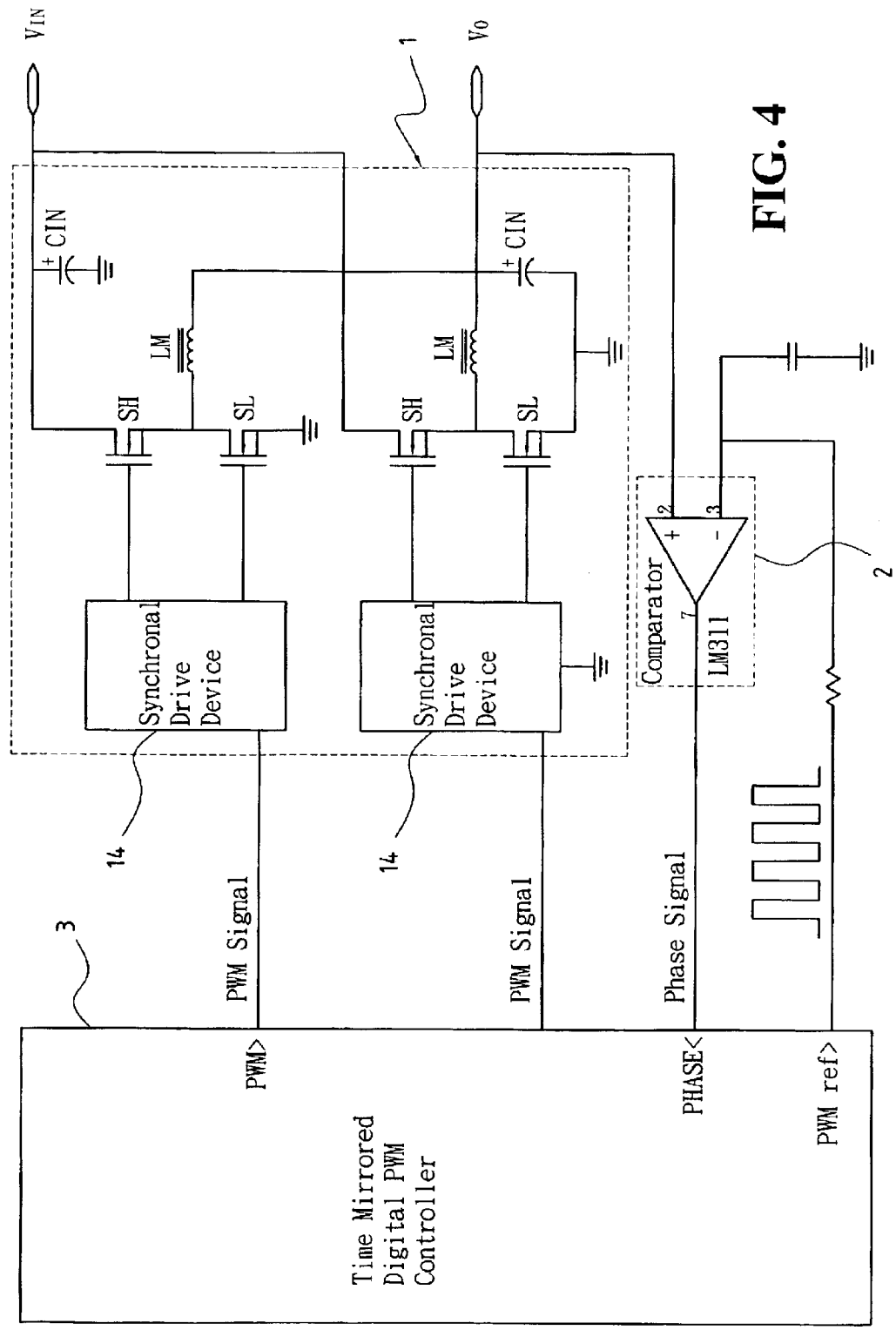
FIG. 4 depicts a diagram showing the detailed circuit connection of the digital trace pulse width modulate controller in a second embodiment of the present invention.

FIG. 3 is a detailed connection diagram showing the function of each unit of the digital dynamic trace adjustment pulse width modulate controller in the first embodiment. FIG. 4 is a detailed electric current connection diagram showing the function of each unit of the digital dynamic trace adjustment pulse width modulate controller in accordance with a second embodiment of the present invention. The main difference is that the original synchronal device drives at most ten (10) amperes, in order to generate twenty (20) amperes in the converter unit 1. It is required to connect two synchronal drive devices 14 in parallel.

The second embodiment of the present invention may have the characteristic such that the time elapsed in high level is equal to the time elapsed in low level, and a second characteristic of the present invention is obtained such that the root mean square of the output voltage (Vo) is equal to the root mean square of a reference voltage (Vref) 12b.

As will be understood by persons skilled in the art, the foregoing preferred embodiments of the present invention are illustrative of the present invention rather than limiting the present invention. Having described the invention in connection with the preferred embodiments, modification will now suggest itself to those skilled in the art Thus, the invention is not to be limited to these embodiments but rather the invention is intended to cover various modifications and similar arrangements included within the spirit and scope of the appended claims, the scope of which should be accorded the broadest interpretation so as to encompass all such modification and similar structure.

What is claimed is:

1. A digital dynamic trace adjustment pulse width modulate controller comprising:

a converter unit comprising at least one input end and at least one output end, said input end being the input channel of pulse width modulate signal, through the control of said input pulse width modulate signal, said output end generating an output voltage (Vo), for providing at least one load to use;

a comparator unit comprising a positive input end, a negative input end and an output end, wherein said positive input end and said negative input end have an output voltage (Vo) and a reference voltage (Vset) from said converter unit, said output end providing a phase signal for output, said phase signal having a high-level standard and a low-level standard, wherein the time elapsed when phase signal is on high level is increasing when said output voltage is dropping, and/or said time elapsed when phase signal is on low level is shorten when the output voltage is dropping. and said time elapsed when phase signal on high level standard is shortening when said output voltage is rising, and/or the time elapsed when phase signal is on low level is extending when said output voltage is increasing; and a core digital processing unit having at least one input end and at least one output end, wherein said input end receive said phase signal as an input and output of a pulse width modulate signal to said output end;

through the function of the above units, said time elapsed in high level being equal to the time elapsed in low level, and the root mean square of the output voltage (Vo) of the converter unit being equal to the root mean square of the reference voltage (Vref).

2. The digital dynamic trace adjustment pulse width modulate controller as claimed in claim 1, wherein said converter unit outputs an output voltage lying in the range between the maximum voltage level standard and the minimum voltage level standard of the reference voltage.

3. The digital dynamic trace adjustment pulse width modulate controller as claimed in claim 1, wherein said pulse width modulate signal has a high-side and a low-side level standard, the output voltage of the high-side level standard pulse width modulate signal being able to drive load, and the output voltage of said low-side level standard of the pulse width modulate being unable to drive load.

4. The digital dynamic trace adjustment pulse width modulate controller as claimed in claim 1, wherein said core digital processing unit receives phase signal from said input end and outputs a pulse width modulate signal to said output end, and wherein the time elapsed when phase signal is on high level standard is increased when said output voltage is dropping, and/or the time elapsed in low level standard of the output voltage is dropping when the output voltage is dropping, thus changing the output pulse width modulate signal, such that the output voltage of the converter unit is rising, and the time elapsed in high level standard is equal to the time elapsed of low level standard, ensuing that duty rate of said phase signal is maintained at fifty percent degree.

5. The digital dynamic trace adjustment pulse width modulate controller as claimed in claim 1, wherein said core digital processing unit receives phase signal from said input end, the time elapsed when phase signal is on high level standard being shortened when said output voltage is increasing, and said time elapsed when phase signal is on low level being extended when said output voltage is dropping, said time elapsed when phase signal is on low level being equal to said time elapsed when phase signal is on high level, ensuring the duty rate is maintained at fifty percent degree.

* * * * *